United States Patent [19]
Wozniczka et al.

[11] Patent Number: 5,789,091
[45] Date of Patent: Aug. 4, 1998

[54] ELECTROCHEMICAL FUEL CELL STACK WITH COMPRESSION BANDS

[75] Inventors: Boguslaw Wozniczka, Coquitlam; Nicholas J. Fletcher, Vancouver; Peter R. Gibb, Coquitlam, all of Canada

[73] Assignee: Ballard Power Systems Inc., Burnaby, Canada

[21] Appl. No.: 752,735

[22] Filed: Nov. 19, 1996

[51] Int. Cl.⁶ .................................................. H01M 8/24
[52] U.S. Cl. .......................... 429/12; 429/30; 429/37
[58] Field of Search .......................... 429/34, 30, 12, 429/96, 37

[56] References Cited

U.S. PATENT DOCUMENTS

| | | |
|---|---|---|
| 3,012,086 | 12/1961 | Vahldieck .................... 429/34 X |
| 3,134,697 | 5/1964 | Niedrach . |
| 3,297,490 | 1/1967 | Barber et al. . |
| 4,020,244 | 4/1977 | Selinko . |
| 4,057,479 | 11/1977 | Campbell . |
| 4,060,670 | 11/1977 | Tamminen . |
| 4,175,165 | 11/1979 | Adlhart . |
| 4,214,969 | 7/1980 | Lawrance . |
| 4,430,390 | 2/1984 | Fekete et al. ................ 429/34 |
| 4,478,917 | 10/1984 | Fujita et al. . |
| 5,458,989 | 10/1995 | Dodge . |
| 5,484,666 | 1/1996 | Gibb et al. . |
| 5,486,430 | 1/1996 | Gorbell et al. . |
| 5,547,777 | 8/1996 | Richards .................... 429/32 |

OTHER PUBLICATIONS

Abstracts vol. 014, No. 213 (E–0923), Feb. 19, 1990, Japan.

Primary Examiner—Anthony Skapars
Attorney, Agent, or Firm—McAndrews, Held & Malloy, Ltd.

[57] ABSTRACT

An electrochemical fuel cell stack includes a plurality of fuel cell assemblies interposed between a pair of end plate assemblies. The mechanism for securing the stack in its compressed, assembled state includes at least one compression band which circumscribes the end plate assemblies and interposed fuel cell assemblies of the stack. Preferably, at least one of the end plate assemblies comprises a resilient member which cooperates with each compression band to urge the first end plate assembly toward the second end plate assembly, thereby applying compressive force to the fuel cell assemblies to promote sealing and electrical contact between the layers forming the fuel cell stack.

17 Claims, 5 Drawing Sheets

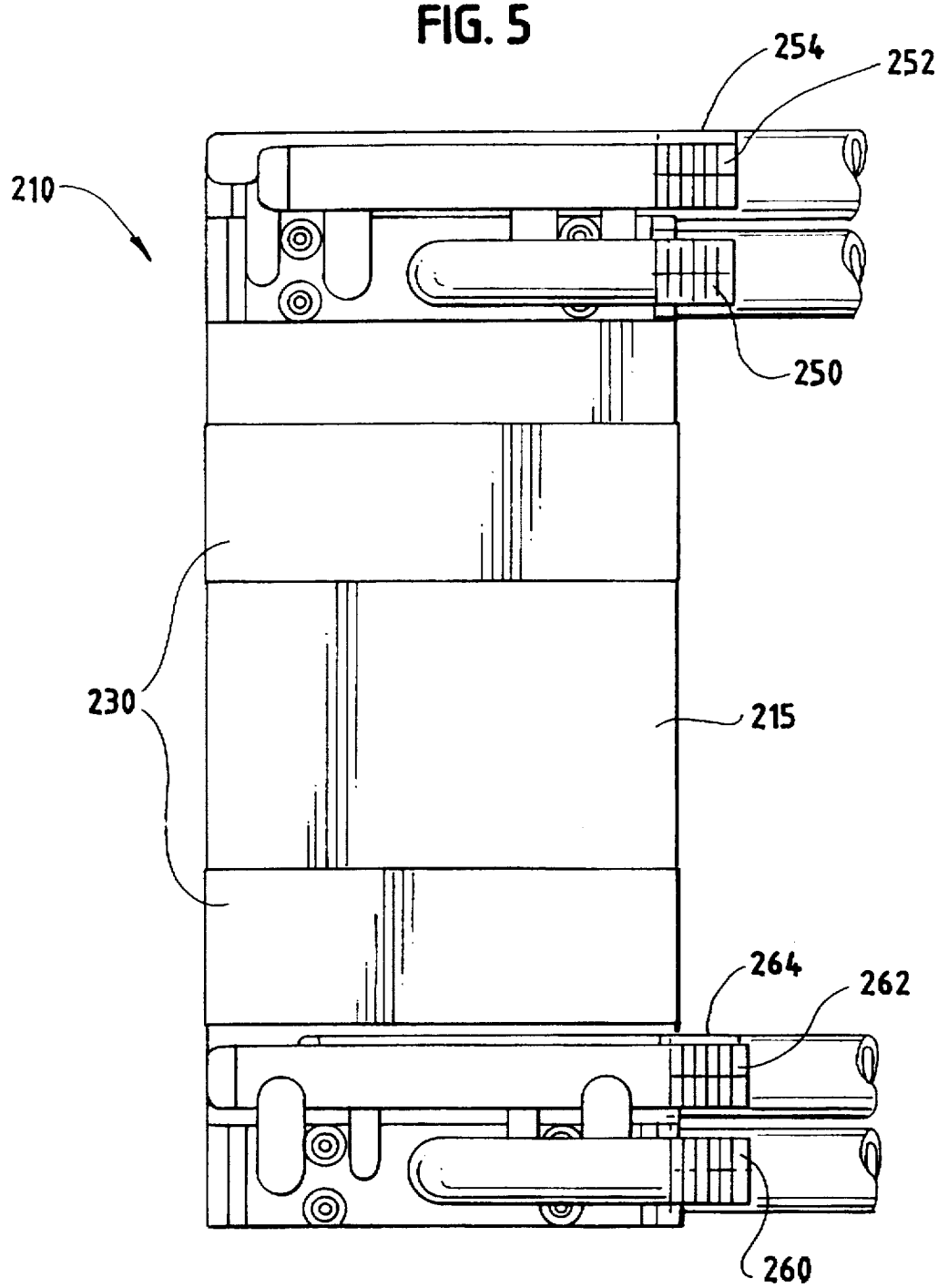

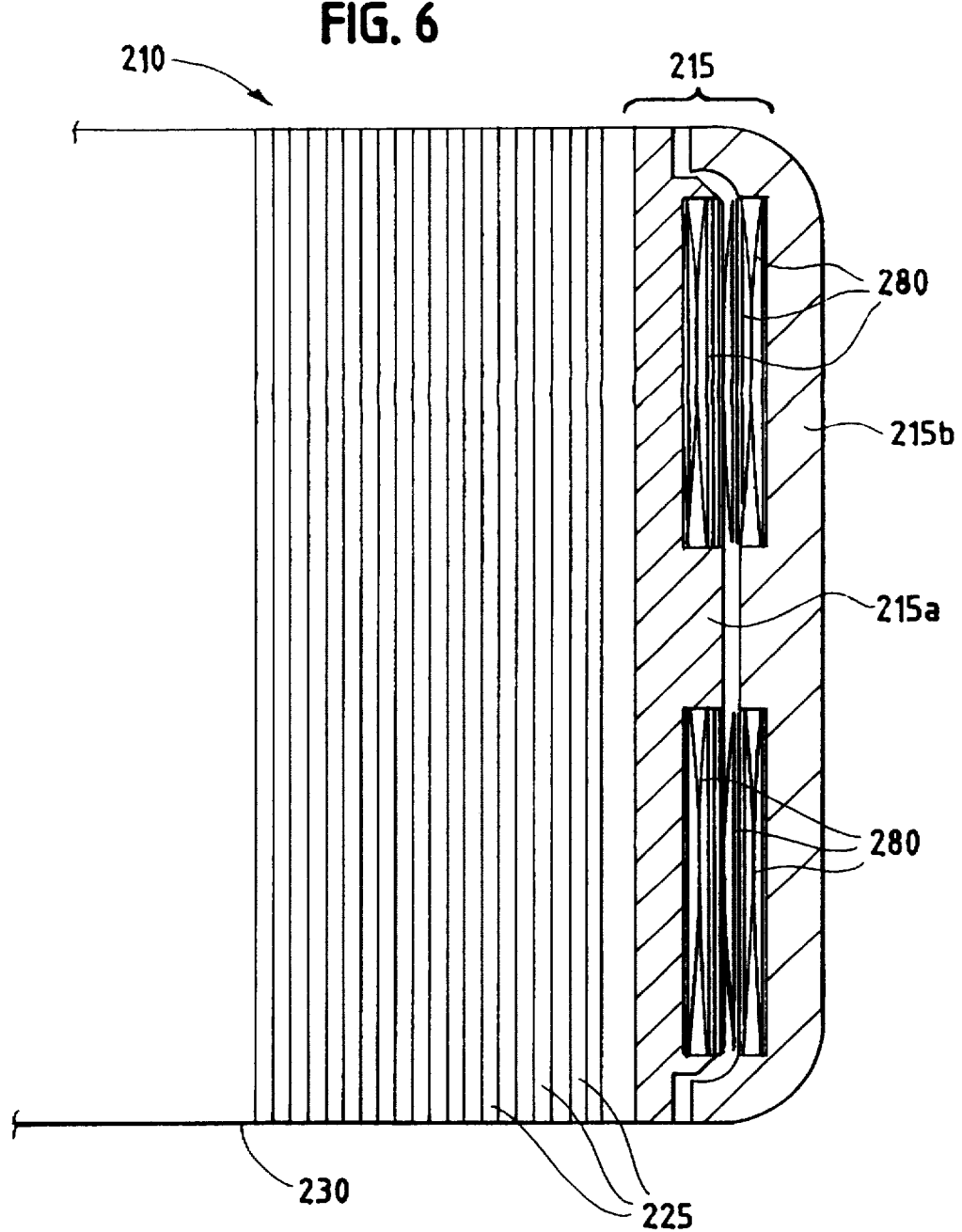

ELECTROCHEMICAL FUEL CELL STACK WITH COMPRESSION BANDS

FIELD OF THE INVENTION

The present invention relates to electrochemical fuel cells. More particularly, the present invention relates to an electrochemical fuel cell stack in which the mechanism for securing the stack in its compressed, assembled state includes at least one compression band which circumscribes the stack in the longitudinal direction.

BACKGROUND OF THE INVENTION

Electrochemical fuel cells convert fuel and oxidant to electricity and reaction product. Solid polymer electrochemical fuel cells generally employ a membrane electrode assembly ("MEA") consisting of a solid polymer electrolyte or ion exchange membrane disposed between two electrode layers comprising porous, electrically conductive sheet material and an electrocatalyst disposed at each membrane/electrode layer interface to induce the desired electrochemical reaction.

In typical fuel cells, the MEA is disposed between two electrically conductive separator or fluid flow field plates. Fluid flow field plates have at least one flow passage formed therein to direct the fuel and oxidant to the respective electrode layers, namely, the anode on the fuel side and the cathode on the oxidant side. In a single cell arrangement, fluid flow field plates are provided on each of the anode and cathode sides. The plates act as current collectors and provide support for the electrodes.

Two or more fuel cells can be connected together, generally in series but sometimes in parallel, to increase the overall power output of the assembly. In series arrangements, one side of a given plate serves as an anode plate for one cell and the other side of the plate can serve as the cathode plate for the adjacent cell. Such a series connected multiple fuel cell arrangement is referred to as a fuel cell stack, and is typically held together in its assembled state by tie rods and end plates.

The stack typically includes manifolds and inlet ports for directing the fuel and the oxidant to the anode and cathode flow field passages respectively. The stack also usually includes a manifold and inlet port for directing a coolant fluid, typically water, to interior passages within the stack to absorb heat generated by the exothermic reaction in the fuel cells. The stack also generally includes exhaust manifolds and outlet ports for expelling the unreacted fuel and oxidant gases, as well as an exhaust manifold and outlet port for the coolant stream exiting the stack.

In conventional fuel cell designs, such as, for example, the fuel cells described and illustrated in U.S. Pat. Nos. 3,134,697, 3,297,490, 4,057,479, 4,214,969 and 4,478,917, the plates which make up each conventional fuel cell assembly are compressed and maintained in their assembled states by tie rods. The tie rods extend through holes formed in the peripheral edge portion of the stack end plates and have associated nuts or other fastening means assembling the tie rods to the stack assembly and compressing the end plates of the fuel cell stack assembly toward each other. Typically the tie rods are external, that is, they do not extend through the fuel cell separator or flow field plates. One reason for employing a peripheral edge location for the tie rods in conventional designs is to avoid the introduction of openings in the central, electrochemically active portion of the fuel cells.

The peripheral edge location of the tie rods in conventional fuel cell designs has inherent disadvantages. It requires that the thickness of the end plates be substantial in order to evenly transmit the compressive force across the entire area of the plate. Also, the peripheral location of the tie rods can induce deflection of the end plates over time if they are not of sufficient thickness. Inadequate compressive forces can compromise the seals associated with the manifolds and flow fields in the central regions of the interior plates, and also compromise the electrical contact required across the surfaces of the plates and membrane electrode assemblies to provide the serial electrical connection among the fuel cells which make up the stack. However, end plates of substantial thickness contribute significantly to the overall weight and volume of the fuel cell stack, which is particularly undesirable in motive fuel cell applications. Also, when external tie rods are employed, each of the end plates must be greater in area than the stacked fuel cell assemblies. The amount by which the end plates protrude beyond the fuel cell assemblies depends on the thickness of the tie rods, and more importantly on the diameter of the washers, nuts and any springs threaded on the ends of tie rods, since preferably these components should not overhang the edges of end plate. Thus the use of external tie rods can increase stack volume significantly.

Various designs in which one or more rigid compression bars extend across each end plate, the bars being connected (typically via external tie rods and fasteners) to corresponding bars at the opposite end plate have been employed in an effort to reduce the end plate thickness and weight, and to distribute compressive forces more evenly. Such a design is described and illustrated in U.S. Pat. No. 5,486,430, which is incorporated herein by reference in its entirety.

A compact fuel cell stack design incorporating internal tie rods which extend between the end plates through openings in the fuel cell plates and membrane electrode assemblies has been reported in U.S. Pat. No. 5,484,666, which is incorporated herein by reference in its entirety.

The fuel cell stack compression mechanisms described above typically utilize springs, hydraulic or pneumatic pistons, pressure pads or other resilient compressive means which cooperate with the tie rods, which are generally substantially rigid, and end plates to urge the two end plates towards each other to compress the fuel cell stack.

Tie rods typically add significantly to the weight of the stack and are difficult to accommodate without increasing the stack volume. The associated fasteners add to the number of different parts required to assemble a fuel cell stack.

The present invention provides a simple, compact and light-weight compression mechanism for a fuel cell stack.

SUMMARY OF THE INVENTION

An electrochemical fuel cell stack with a simple, compact and lightweight compression mechanism comprises a first end plate assembly, a second end plate assembly, and at least one electrochemical fuel cell assembly interposed between the first and second end plate assemblies. The at least one fuel cell assembly comprises an anode layer, a cathode layer and an electrolyte interposed between the anode and cathode layers. The stack further comprises at least one compression band circumscribing in a single pass the first and second end plate assemblies and the interposed electrochemical fuel cell assemblies. Thus, the at least one compression band extends around the stack in the longitudinal (layered) direction, and extends across the face of both end plate assemblies. "Single pass" means that the band extends less than twice around the stack in the longitudinal (layered) direction. Preferably the end plate assemblies do not protrude beyond the edges of the stacked fuel cell assemblies, thus the end plate assemblies only increase the stack dimensions in the longitudinal direction.

The compression band is preferably elongate in cross-section. Preferably the electrolyte is an ion exchange membrane, wherein the electrochemical fuel cell stack is a solid polymer fuel cell stack.

Typically, the at least one compression band is resilient. In one embodiment, the at least one compression band is elastic such that the first end plate assembly is urged toward the second end plate assembly, thereby applying compressive force to the at least one fuel cell assembly.

Preferably the stack comprises at least two compression bands. When more than one compression band is used the bands may be fitted on the stack such that they cross each other on the end plate assemblies, but preferably they are non-intersecting and extend around the stack substantially in parallel.

Preferably the fuel cell stack further comprises at least one resilient member whereby said resilient member cooperates with said compression band to urge said first end plate assembly toward said second end plate assembly, thereby applying compressive force to said at least one fuel cell assembly. For example, one or more spring plates could be layered in the stack. The at least one resilient member may be located in one or both of the end plate assemblies. For example, disc or other types of springs may be interposed between the compression band and the end plate assembly, between the end plate assembly and the adjacent fuel cell assembly, or preferably between a pair of plates which form part of the end plate assembly. In another embodiment, the end plate assembly may comprise a slightly concave plate.

The compression bands may be used in conjunction with a hydraulic or pneumatic piston located in one of the end plate assemblies.

Preferred materials for the compression bands include, but are not limited to, metals such as stainless steel, high strength polymers, high strength fiber composites such as polyparaphenylene terephthalamide (Kevlar®) based strapping, and woven or twisted wire bands. Preferably the bands are thin, flat strips of material having elongate cross-section so that their thickness does not add significantly to the stack volume. However, the use of bands with other cross-sectional shapes, or corrugations perpendicular to the longitudinal direction, may be advantageous in some instances. If electrically conductive compressive bands are used, preferably they are electrically isolated from the fuel cells in the stack.

Depending on the material it may be possible to form the compression bands as continuous structure (with no discernable join). Alternatively, the ends of the strapping may be joined, for example, by welding, crimping or by means of a fastening mechanism, either prior to or after fitting the band on the fuel cell stack.

In a further embodiment the length of the compression band is adjustable even after it is installed on the stack, whereby the compressive force applied to said at least one fuel cell assembly is adjustable.

BRIEF DESCRIPTION OF THE DRAWINGS

FIG. 5 is an end elevation view of an electrochemical fuel cell stack.

FIG. 6 is a side cross-sectional view of an end plate assembly comprising a pair of layered plates with stacks of disc springs interposed between them.

DETAILED DESCRIPTION OF THE PREFERRED EMBODIMENTS

Figure 1:
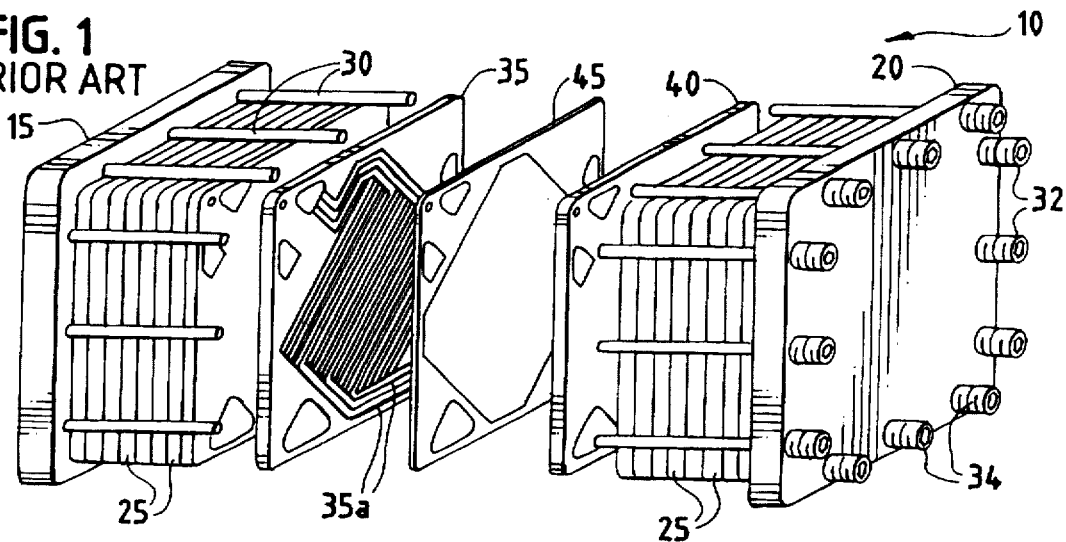
FIG. 1 is a partially exploded perspective view of a conventional (prior art) solid polymer fuel cell stack with end plates and external tie rods.

FIG. 1 illustrates a conventional (prior art) solid polymer fuel cell stack 10, including a pair of end plate assemblies 15, 20 and a plurality of fuel cell assemblies 25. Tie rods 30 extend between end plate assemblies 15 and 20 to retain and secure stack assembly 10 in its assembled state with fastening nuts 32. Springs 34 threaded on the tie rods 30 interposed between the fastening nuts 32 and the end plate 20 apply resilient compressive force to the stack in the longitudinal direction. Reactant and coolant fluid streams are supplied to and exhausted from internal manifolds and passages in the stack 10 via inlet and outlet ports (not shown) in end plate 15.

As also shown in exploded form in FIG. 1, each fuel cell assembly 25 includes an anode flow field plate 35, a cathode flow field plate 40, and a membrane electrode assembly 45 interposed between plates 35 and 40. Plate 35 has a plurality of fluid flow passages 35a formed in its major surface facing membrane electrode assembly 45.

Figure 2:
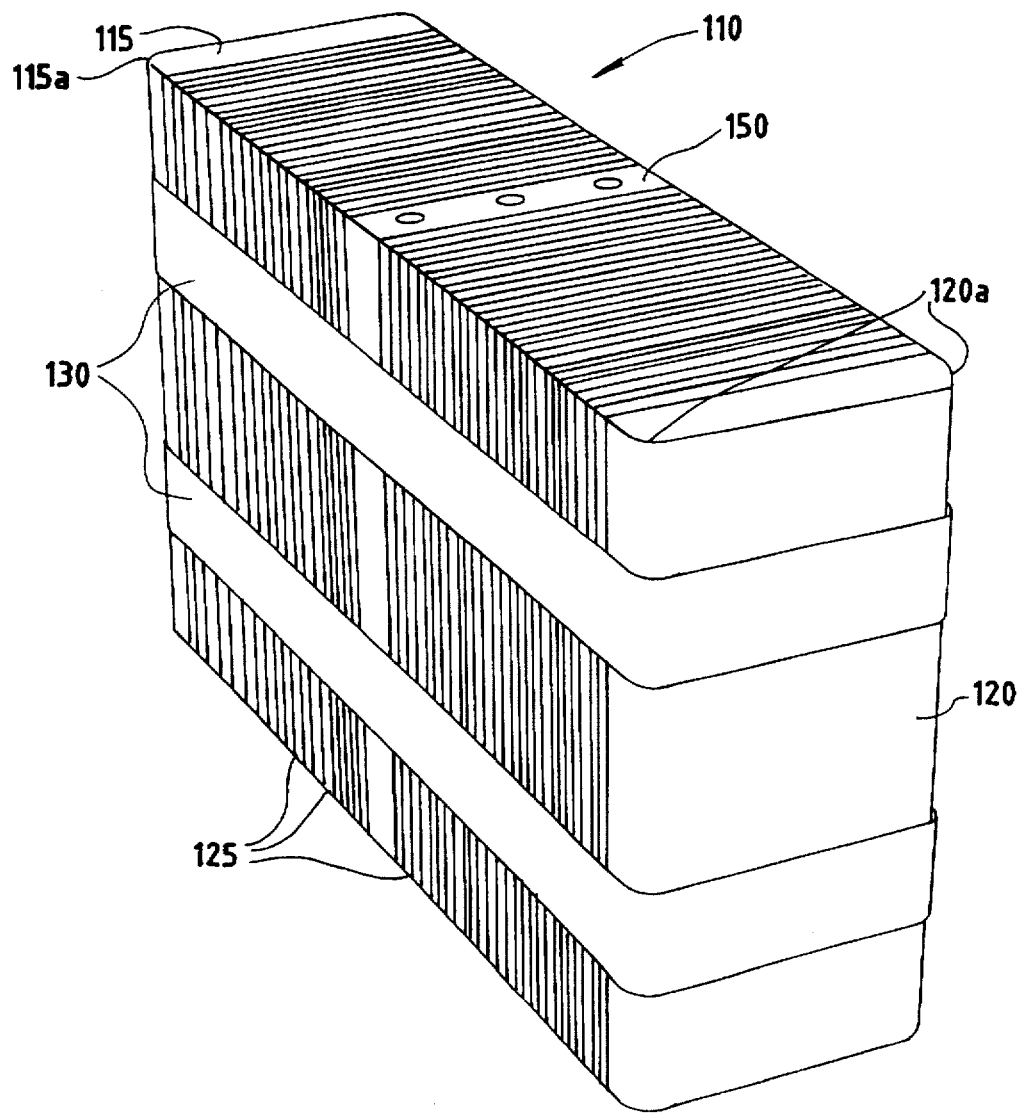
FIG. 2 is a perspective view of a preferred embodiment of an electrochemical fuel cell stack with two compression bands circumscribing the stack.

FIG. 2 illustrates a fuel cell stack 110 including end plate assemblies 115 and 120 and a plurality of fuel cell assemblies 125 interposed between the end plate assemblies 115, 120. Compression bands 130 extending tightly around the end plate assemblies and fuel cell assemblies retain and secure stack 110 in its assembled state.

The end plate assemblies 115, 120 preferably have rounded edges 115a, 120a to reduce the stress on the band.

In the illustrated embodiment of a fuel cell stack 110, reactant and coolant fluid streams are supplied to and exhausted from internal manifolds and passages in the stack 110 via a central fluid distribution plate 150. In a preferred embodiment, compression bands 130 are formed from rolled stainless steel (for example, 301 grade, 0.025 inch thickness, 2.5 inch width, tensile strength 26,000 psi) strapping, which is pre-welded to the desired length (circumference). When the band is fitted on the stack preferably the welded joint is located on one of the end plate assemblies. Strips of electrically insulating material (not shown in FIG. 2) are interposed between the bands 130 and the edges of the fuel cell assemblies 225.

The compression band may be applied to the stack in various ways, including, but not limited to those described below. Factors in determining the preferred fitting method include the nature of the compression band, the nature of any resilient members incorporated in the stack and the design of the stack including that of the end plate assemblies. For example, if the compression band is formed as a continuous structure (or if it is preferable to join the ends of it prior to fitting it around the stack), the stack may be slightly "overcompressed" in a fixture, one or more compression bands slipped around the stack, and the stack released from the fixture. If the compression band is sufficiently stretchable and resilient it may be stretched in order to fit it around the stack. The ends of the compression band may be joined after it is wrapped around the stack, in which case, to ensure a tight fit, it may be again desirable to over-compress the stack in a fixture until one or more bands are fitted. If the length of the compression band is adjustable, the band may be fitted and subsequently tightened.

The longitudinal dimension of the stack can vary, even for a fixed stack design, due to slight differences in the thicknesses of stack components. Also, during use the longitudinal dimension of the stack tends to change. In some cases, for example if the length of the compression band is not readily adjustable, it may be desirable to use spacer layers to increase the stack length, for example, during initial stack assembly and/or after prolonged use. This approach can be used to ensure that the desired compressive force is applied to the stack, without the need to prepare and inventory compression bands of many slightly differing lengths.

Figure 3:
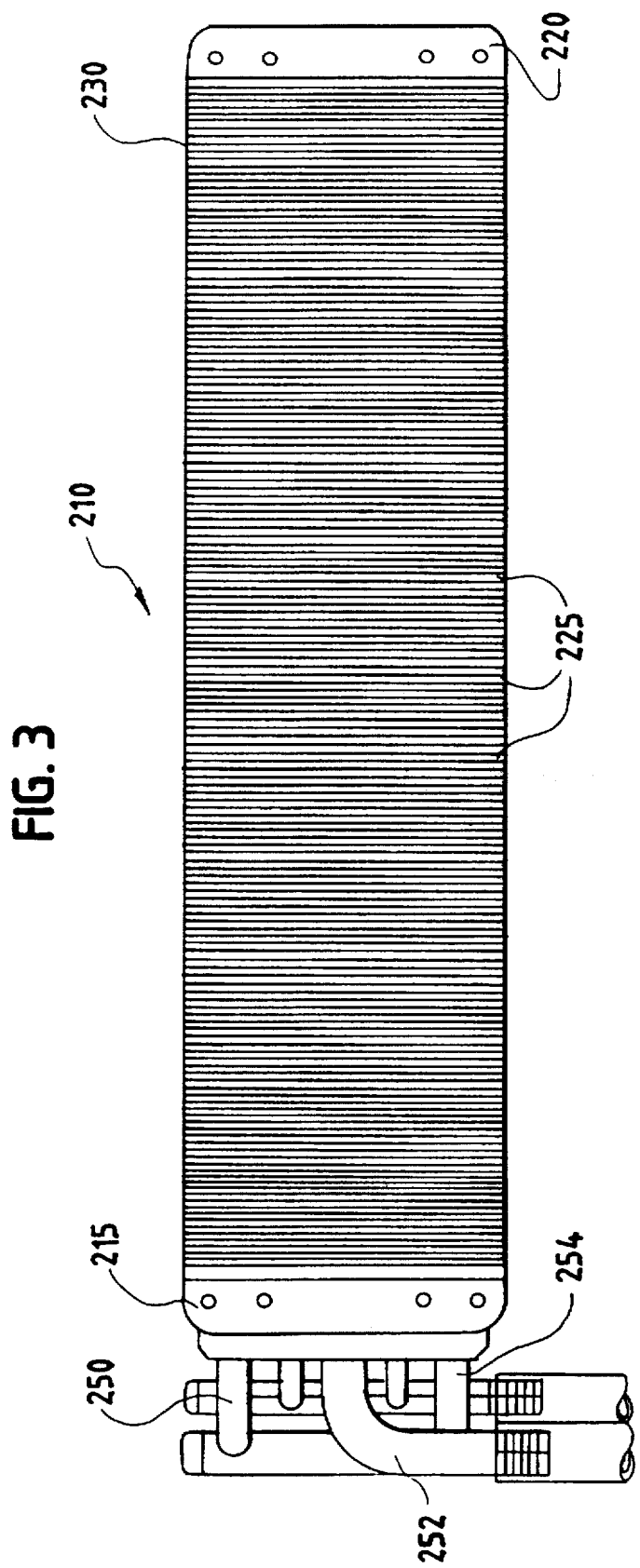
FIG. 3 is a top elevation view of an electrochemical fuel cell stack.

FIG. 3 is a top elevation view of an electrochemical fuel cell stack 210 similar to the stack 110 illustrated in FIG. 2. Stack 210 includes end plate assemblies 215 and 220 and a plurality of fuel cell assemblies 225 interposed between them. Compression band 230 extends around the end plate assemblies 215, 220 and fuel cell assemblies 225. In the illustrated embodiment of a fuel cell stack 210, reactant and coolant fluid streams are supplied to internal manifolds and passages in the stack 210 via inlet ports 250, 252 and 254 located in end plate assembly 215. Corresponding outlet ports (not shown) are also located in end plate assembly 215. It is sometimes advantageous to locate all of the inlet and outlet ports at the same end of the stack.

Figure 4:
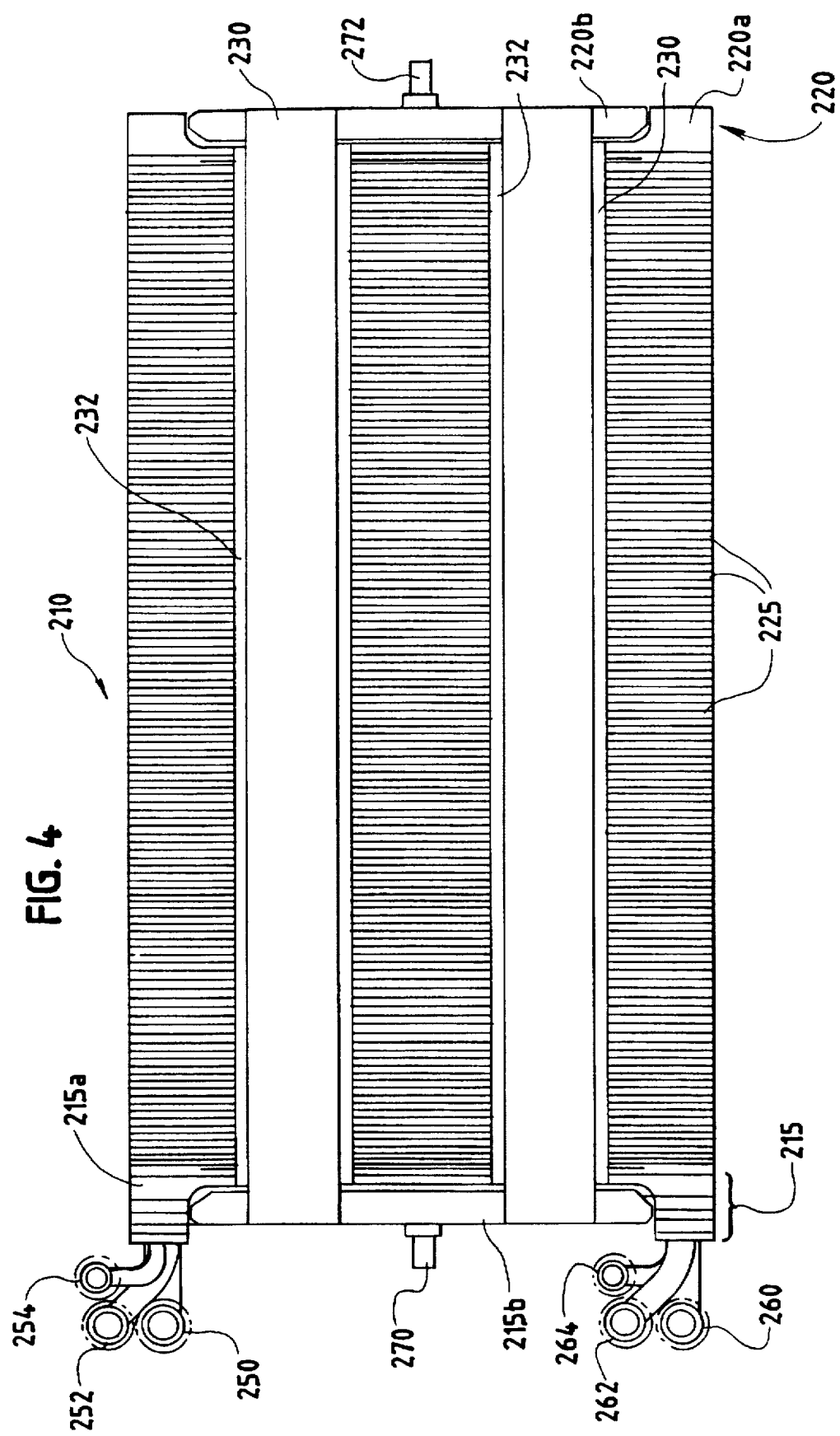
FIG. 4 is a side elevation view of the electrochemical fuel cell stack of FIG. 3, showing two compression-bands circumscribing the stack.

FIG. 4 is a side elevation view of electrochemical fuel cell stack 210. Stack 210 includes end plate assemblies 215 and 220 and a plurality of fuel cell assemblies 225 interposed between them. End plate assemblies 215 and 220 each comprise a pair of plates 215a, 215b and 220a, 220b respectively, which have stacked disc springs (not shown) disposed between them. Compression bands 230 extend around the end plate assemblies 215, 220 and fuel cell assemblies 225. Strips of electrically insulating material 232 are interposed between the straps and the edges of the fuel cell assemblies 225. The stack is connected to a load (not shown) by means of positive and negative electrical terminals 270 and 272.

Reactant and coolant fluid streams are supplied to internal manifolds and passages in the stack 210 via inlet ports 250, 252 and 254 located in end plate assembly 215. The fluid streams are exhausted from the stack 210 via corresponding outlet ports 260, 262, 264 also located in end plate assembly 215.

FIG. 5 is an end elevation view of an electrochemical fuel cell stack 210, showing end plate assembly 215 and two compression bands 230 extending across the exterior planar surface of the end plate assembly 215 and around the stack. Reactant and coolant fluid streams are supplied to internal manifolds and passages in the stack 210 via inlet ports 250, 252 and 254 located in end plate assembly 215. The fluid streams are exhausted from the stack 210 via corresponding outlet ports 260, 262, 264 also located in end plate assembly 215.

FIG. 6 is a side cross-sectional view of an end plate assembly 215, of fuel cell stack 210, comprising a pair of layered plates 215a, 215b with stacks of disc springs 280 interposed between them. Compression band 230 and fuel cell assemblies 225 are shown.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An electrochemical fuel cell stack comprising:
   a. a first end plate assembly;
   b. a second end plate assembly;
   c. at least one electrochemical fuel cell assembly interposed between said first and second end plate assemblies, said at least one fuel cell assembly comprising an anode layer, a cathode layer and an electrolyte interposed between said anode layer and said cathode layer; and
   d. a resilient compression assembly comprising at least one compression band circumscribing in a single pass said first and second end plate assemblies and said interposed electrochemical fuel cell assemblies, said resilient compression assemblies, said first end plate assembly toward said second end plate assembly, thereby applying compressive force upon said at least one fuel cell assembly.

2. The electrochemical fuel cell stack of claim 1 wherein said at least one compression band is elongate in cross-section.

3. The electrochemical fuel cell stack of claim 1 wherein said electrolyte is an ion exchange membrane.

4. The electrochemical fuel cell stack of claim 1 wherein said at least one compression band is elastic.

5. The electrochemical fuel cell stack of claim 1 wherein said at least one compression band is at least two compression bands.

6. The electrochemical fuel cell stack of claim 5 wherein said at least two compression bands are non-intersecting.

7. The electrochemical fuel cell stack of claim 1 wherein said resilient compression assembly further comprises at least one resilient member whereby said resilient member cooperates with said compression band to urge said first end plate assembly toward said second end plate assembly, thereby applying compressive force to said at least one fuel cell assembly.

8. The electrochemical fuel cell stack of claim 7 wherein said at least one resilient member comprises a plurality of spring plates interposed between said end plate assemblies.

9. The electrochemical fuel cell stack of claim 7 wherein said first end plate assembly further comprises said resilient member.

10. The electrochemical fuel cell stack of claim 9 wherein said at least one resilient member comprises a plurality of stacked disc springs.

11. The electrochemical fuel cell stack of claim 10 wherein said first end plate assembly comprises a pair of plates, and said plurality of stacked disc springs is interposed between said pair of plates.

12. The electrochemical fuel cell stack of claim 9 wherein said at least one resilient member comprises a piston.

13. The electrochemical fuel cell stack of claim 1 wherein said at least one compression band is formed from stainless steel.

14. The electrochemical fuel cell stack of claim 1 wherein said at least one compression band is formed from a polymeric material.

15. The electrochemical fuel cell stack of claim 1 wherein said at least one compression band is formed from a fiber-based composite material.

16. The electrochemical fuel cell stack of claim 1 wherein said at least one compression band is a continuous structure.

17. The electrochemical fuel cell stack of claim 1 wherein the length of said at least one compression band is adjustable, whereby said compressive force applied to said at least one fuel cell assembly is adjustable.

* * * * *

UNITED STATES PATENT AND TRADEMARK OFFICE
CERTIFICATE OF CORRECTION

PATENT NO.   :   5,789,091
DATED         :   August 4, 1998
INVENTOR(S) :   Wozniczka et al.

It is certified that error appears in the above-identified patent and that said Letters Patent is hereby corrected as shown below:

At Col. 6, line 22, delete "assemblies" and substitute therefor --assembly--

At Col. 6, line 22, after the word "assembly" insert --urging--

Signed and Sealed this

Third Day of April, 2001

*Attest:*

NICHOLAS P. GODICI

*Attesting Officer*    Acting Director of the United States Patent and Trademark Office

(12) REEXAMINATION CERTIFICATE (4280th)
United States Patent
Wozniczka et al.

(10) Number: US 5,789,091 C1
(45) Certificate Issued: Feb. 27, 2001

(54) ELECTROCHEMICAL FUEL CELL STACK WITH COMPRESSION BANDS

(75) Inventors: Boguslaw Wozniczka, Coquitlam; Nicholas J. Fletcher, Vancouver; Peter R. Gibb, Coquitlam, all of (CA)

(73) Assignee: Ballard Power Systems Inc., Burnaby (CA)

Reexamination Request:
No. 90/005,388, Jul. 7, 1999

Reexamination Certificate for:
Patent No.: 5,789,091
Issued: Aug. 4, 1998
Appl. No.: 08/752,735
Filed: Nov. 19, 1996

(51) Int. Cl.$^7$ ........................................... H01M 8/24
(52) U.S. Cl. ........................ 429/12; 429/30; 429/37
(58) Field of Search ........................ 429/12, 30, 34, 429/37, 96

(56) References Cited

U.S. PATENT DOCUMENTS 4,175,165  11/1979  Adlhart .
5,364,711  11/1994  Yamada et al. .
5,484,666   1/1996  Gibb et al. .

FOREIGN PATENT DOCUMENTS 0 620 609   10/1994  (EP) .
2063551      6/1981  (GB) .
61-273873    4/1986  (JP) .
63-043270    2/1988  (JP) .
2-049360    10/1988  (JP) .

*Primary Examiner*—Stephen Kalafut

(57) ABSTRACT

An electrochemical fuel cell stack includes a plurality of fuel cell assemblies interposed between a pair of end plate assemblies. The mechanism for securing the stack in its compressed, assembled state includes at least one compression band which circumscribes the end plate assemblies and interposed fuel cell assemblies of the stack. Preferably, at least one of the end plate assemblies comprises a resilient member which cooperates with each compression band to urge the first end plate assembly toward the second end plate assembly, thereby applying compressive force to the fuel cell assemblies to promote sealing and electrical contact between the layers forming the fuel cell stack.

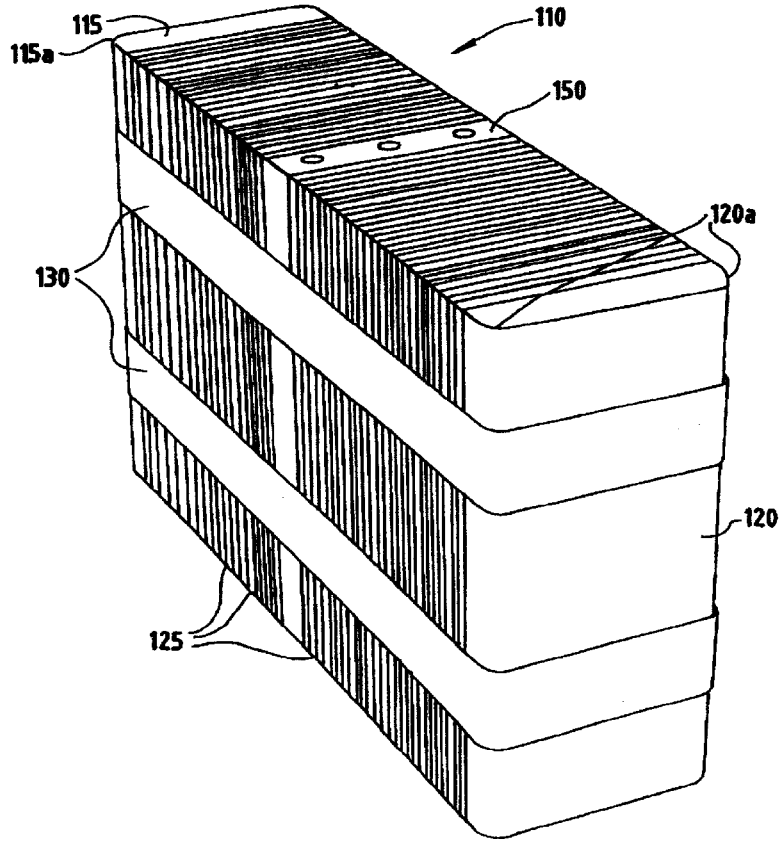

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 7 is cancelled.

Claims 1, 8, 9 and 17 are determined to be patentable as amended.

Claims 2–6 and 10–16, dependent on an amended claim, are determined to be patentable.

New claims 18 and 19 are added and determined to be patentable.

1. An electrochemical fuel cell stack comprising:
   (a) a first end plate assembly;
   (b) a second end plate assembly;
   (c) at least one electrochemical fuel cell assembly interposed between said first and second end plate assemblies, said at least one fuel cell assembly comprising an anode layer, a cathode layer and an electrolyte interposed between said anode layer and said cathode layer; and
   (d) A resilient compression assembly comprising at least one compression band *and at least one resilient member, said at least one compression band* circumscribing in a single pass said first and second end plate assemblies, *said at least one resilient member and said at least one interposed electrochemical fuel cell* [assemblies, said resilient compression assemblies,] *assembly,* [urging] *whereby said resilient member cooperates with said at least one compression band to urge* said first end plate assembly toward said second end plate assembly, thereby applying compressive force upon said at least one fuel cell assembly.

8. The electrochemical fuel cell stack of claim [7] *1* wherein said at least one resilient member comprises a plurality of spring plates interposed between said end plate assemblies.

9. The electrochemical fuel cell stack of claim [7] *1* wherein said first end plate assembly further comprises said resilient member.

17. The electrochemical fuel cell stack of claim 1 wherein the length of said at least one compression band is adjustable, *beyond said at least one compression band's inherent resiliency,* whereby said compressive force applied to said at least one fuel cell assembly is adjustable.

*18. In an electrochemical fuel cell stack comprising a first end plate assembly, a second end plate assembly, and at least one electrochemical fuel cell assembly interposed between said first and second end plate assemblies, said at least one fuel cell assembly comprising an anode layer, a cathode layer and an electrolyte interposed between said anode layer and said cathode layer, the improvement comprising:*

*said at least one electrochemical fuel cell stack further comprising a resilient compression assembly comprising at least one compression band and at least one resilient member, said at least one compression band circumscribing in a single pass said first and second end plate assemblies, said at least one resilient member and said at least one interposed electrochemical fuel cell assembly, the length of said at least one compression band being adjustable, beyond said at least one band's inherent resiliency, whereby said resilient assembly urges said first end plate assembly toward said second end plate assembly, thereby applying adjustable compressive force upon said at least one fuel cell assembly.*

*19. The improved electrochemical fuel cell stack of claim 18, wherein said at least one compression band cooperates with said at least one resilient member to urge said first end plate assembly toward said second plate assembly.*

* * * * *